United States Patent [19]

Wenner

[11] Patent Number: 4,663,172

[45] Date of Patent: May 5, 1987

[54] MILK FOOD PROCESS

[75] Inventor: Valentin Wenner, La Tour-de-Peilz, Switzerland

[73] Assignee: Nestec S.A., Vevey, Switzerland

[21] Appl. No.: 732,223

[22] Filed: May 8, 1985

[30] Foreign Application Priority Data

May 22, 1984 [CH] Switzerland .................... 2512/84

[51] Int. Cl.$^4$ ............................ A23C 9/14; A23C 9/00
[52] U.S. Cl. .................................... 426/271; 426/491; 426/585; 426/801
[58] Field of Search ................. 426/271, 580, 491, 72, 426/74, 585, 801; 210/681, 687

[56] References Cited

U.S. PATENT DOCUMENTS

| 891,336 | 6/1908 | Hatmaker | 426/801 |
| 2,708,632 | 5/1955 | Stimpson | 426/271 |
| 2,708,633 | 5/1955 | Stimpson | 426/271 |
| 3,074,796 | 1/1963 | Peebles et al. | 426/271 |
| 3,901,979 | 8/1975 | Nagasawa et al. | 426/801 |

Primary Examiner—George Yeung
Attorney, Agent, or Firm—Vogt & O'Donnell

[57] ABSTRACT

A process for the production of a skimmed milk of reduced phosphate and calcium contents.

A skimmed milk is acidified to a pH of from 5.2 to 6.0 and the acidified skimmed milk is passed over an anion exchanger.

12 Claims, No Drawings

MILK FOOD PROCESS

This invention relates to a process for the production of a skimmed milk of reduced phosphate and calcium contents.

It is known that cow's milk can be better adapted to the nutritional and physiological needs of infants by depletion in mineral salts and enrichment with milk serum proteins more readily digestible than casein. It is also known that the gastric secretion of acid and pepsin is relatively low in infants and that a milk adapted to the needs of infants should thus have a low buffering power.

Accordingly, one known process for the production of a milk better adapted to the needs of infants comprises demineralizing a lactoserum by ion exchange or by electrodialysis and adding a caseinate to the demineralized lactoserum. Another known process comprises recombining the constituents of milk, particularly casein or caseinates, ultrafiltered lactoserum proteins, lactose, salt and vitamins, in adequate proportions.

However, these processes are open to criticism in that they involve the elimination of substantial quantities of minor, known or unknown constituents of milk. However, some of these minor constituents can be of considerable value to the metabolism and physiology of infants.

The object of the present invention is to propose a new approach to these problems by adequate reduction of the phosphate and calcium contents of the skimmed milk itself and the use of the product obtained for the production of a milk adapted to the needs of infants. Another object of the present invention is to provide a milk adapted to the needs of infants thus obtained which itself has a reduced calcium content and a reduced phosphate content.

To this end, the process for producing a skimmed milk of reduced phosphate and calcium contents according to the present invention is characterized in that a skimmed milk is acidified to a pH of from 5.2 to 6.0 and the acidified skimmed milk is passed over an anion exchanger. The skimmed milk is preferably acidified to a pH of from 5.4 to 5.6.

It has been found that, if a skimmed milk is acidified within the indicated limits, the phosphate ions are unexpectedly retained on the anion exchanger preferentially to the citrate and $Cl^-$ ions in contrast to what is observed during the demineralization of lactoserum by ion exchange. It has also been found, again surprisingly, that not only phosphate ions, but also the $Ca^{++}$ ions are thus retained on the anion exchanger.

In the context of the invention, an "acidified skimmed milk" is understood to be a mixture of skimmed milk and an acidifying agent, irrespective of type. Thus, in one embodiment of the process according to the invention where a skimmed milk is acidified by addition of a decationized lactoserum, the "acidified skimmed milk" is the mixture of skimmed milk and decationized lactoserum.

In addition, the expression "demineralized lactoserum" is used hereinafter to designate a decationized and deanionized lactoserum as opposed to a decationized but not deanionized lactoserum.

Finally, the expression "total serum proteins" is used to designate the total nitrogenous matter of the lactoserum determined as total nitrogen multiplied by 6.38.

The milk product of reduced phosphate and calcium contents obtained by the process according to the invention for the production of a milk, adapted to the needs of infants, is characterized in that a mixture is prepared which contains, in percent by weight based on the dry matter of the mixture, from 15 to 25% of dry matter of the skimmed milk of reduced phosphate and calcium contents, from 45 to 55% of dry matter of a demineralized lactoserum and from 25 to 30% of fats.

The milk adapted to the needs of infants obtained by the process according to the present invention is characterized in that it contains, in percent by weight of dry matter, from 4.5 to 5.5% of casein,
from 7.0 to 8.0% of total serum proteins,
from 25 to 30% of fats,
from 54 to 62% of lactose,
from 0.2 to 0.4% of calcium,
from 0.015 to 0.05% of magnesium,
from 0.10 to 0.17% of sodium,
from 0.4 to 0.6% of potassium,
from 0.4 to 0.6% of phosphate,
from 0.3 to 3% of citrate,
from 0.3 to 0.45% of chlorine.

The starting material used for caryring out the process according to the invention may be fresh or reconstituted skimmed cow's milk. This milk is acidified to a pH of from 5.2 to 6.0 and preferably to a pH of from 5.4 to 5.6. The pH range is limited at the lower end by the precipitation of casein. At its upper end, it is limited by the disappearance of the surprising preferential retention of the phosphate to the benefit of the retention of citrate and chloride.

Acidification may be carried out, for example, with citric acid or hydrochloric acid.

In a preferred variant mentioned earlier on, a decationized lactoserum is used. It is preferred to use a soft lactoserum, of the type produced, for example, by cheesemakers making pressed curd and cooked curd cheeses and by manufacturers of rennet casein, decationized by passage over a cation exchanger, particularly an exchanger of the sulfonic type. A lactoserum such as this may advantageously have a pH of from 1.2 to 3.0. It is assumed that, if a decationized lactoserum is particularly suitable for carrying out the process according to the invention, it is because, by dilution, chelation and acidification, it exerts a triple effect in releasing the Ca from the casein micelle which in turn releases the inorganic phosphate from the casein micelle.

In the following step of the process according to the invention, the acidified skimmed milk is passed over an anion exchanger. This exchanger may be in particular of the quaternary ammonium or secondary or tertiary amine type. The anion exchanger may be used in the OH-form. In that case, the skimmed milk which was passed over the exchanger has a mean pH of from about 7.5 to 9 and may be neutralized, preferably with citric acid. The anion exchanger may also be used in the form of citrate and/or $Cl^-$ anions. In that case, the phosphate anions are directly exchanged for the citrate and/or $Cl^-$ anions and no increase in the pH is observed during passage over the exchanger.

The skimmed milk is preferably passed over the anion exchanger in a quantity of from 3.5 to 18 liters of skimmed milk per equivalent of exchanger capacity. By remaining below the minimum ratio thus indicated, an unnecessarily high volume of exchanger is used. By exceeding the maximum ratio thus indicated, the phosphate content of skimmed milk is not sufficiently reduced.

The skimmed milk of reduced phosphate and calcium contents obtained by the process according to the invention is thus an intermediate product intended for use in the production of milks adapted to the needs of infants. As indicated above, this use is best effected by preparing a mixture containing, in percent by weight based on the dry matter of the mixture, from 15 to 25% of dry matter of the skimmed milk of reduced phosphate and calcium contents, from 45 to 55% of dry matter of a demineralized lactoserum and from 25 to 30% of fats. A lactoserum demineralized by ion exchange or by electrodialysis for example, may be used to prepare this mixture, although it is preferred to use a sweet lactoserum demineralized by decationization on a cation exchanger followed by deanionization on an anion exchanger. So far as the fat is concerned, it is preferred to use a milk fat containing a small amount of added vegetable fat.

A dry or liquid mixture may be prepared, depending on whether or not the skimmed milk of reduced phosphate and calcium contents and/or the demineralized lactoserum was dried beforehand, for example, by spray-drying. If necessary, the liquid mixture itself may be spray-dried, for example. The milk thus obtained adapted to the needs of infants itself has a reduced phosphate content and a reduced calcium content. Its composition is shown above.

The invention is illustrated by the following Examples in which the percentages quoted are by weight.

EXAMPLE 1

A skimmed milk having a pH of 6.6 and a dry matter content of 9% and containing, expressed in mg of ions per 100 ml of skimmed milk, 270 mg/100 ml of phosphate
180 mg/100 ml of citrate
120 mg/100 ml of calcium is acidified to pH 5.5 by addition of 1.9 g of citric acid per liter of skimmed milk.

The acidified skimmed milk is passed over an anion exchanger in the OH⁻-form in a quantity of 3.5 l of milk per equivalent of exchanger capacity. The pH of the acidified skimmed mik which was passed over the exchanger initially rises to around 11.5 and then drops back to about 8.5. The mean pH of the milk passed over the exchanger is 9.0. After neutralization to pH 7.0 with citric acid, a skimmed milk of reduced phosphate and calcium contents is obtained which has a dry matter content of 9% and contains, in mg of ions per 100 ml of skimmed milk, 120 mg/100 ml of phosphate
150 mg/100 ml of citrate
57 mg/100 ml of calcium.

COMPARISON EXAMPLE

The procedure is as described in Example 1, except that the skimmed milk is passed directly over the anion exchanger without acidification. The pH of the skimmed milk which was passed over the exchanger again rises but the phosphate content remains constant. Only the citrate and Cl⁻ ions are exchanged for OH⁻.

EXAMPLE 2

The same skimmed milk as in Example 1 is acidified to pH 5.5 by addition of decationized soft lactoserum having a pH of 1.8 and a dry matter content of 5.5% in a quantity of 0.4 l of lactoserum per liter of skimmed milk.

The acidified skimmed milk is passed over an anion exchanger in the OH⁻-form in a quantity of 3.5 l of milk per equivalent of exchanger capacity. The mean pH of the milk which was passed over the exchanger is 9.0. After neutralization to pH 7.0 with citric acid, a skimmed milk of reduced phosphate and calcium contents is obtained which has a dry matter content of 8% and which contains, in mg of ions per 100 ml of skimmed milk, 134 mg/100 ml of phosphate
134 mg/100 ml of citrate
46 mg/100 ml of calcium.

EXAMPLES 3-5

Various skimmed milks of reduced phosphate and calcium contents are prepared in the same way as in Example 2, except that the acidifed skimmed milk is passed over the ion exchanger in different volumes of milk per equivalent of exchanger capacity.

The respective values of the volumes of acidified skimmed milk passed over the anion exchanger (vol. passed), the mean pH's of the milk which was passed over the exchanger (mean pH), the dry matter content of the skimmed milk which was passed over the exchanger (dry matter) and the ion content of the milk after neutralization to pH 7.0 (ions) are shown in the following Table. The corresponding values taken from Examples 1 and 2 are repeated therein. The data of the starting skimmed milk are shown in the extension of the pH, dry matter and ions columns to facilitate comparison.

| Ex. No. | Vol. passed l/equ. | Mean pH | Dry matter % | Ions phosphate mg/100 ml | citrate | Ca |
|---|---|---|---|---|---|---|
| 1 | 3.5 | 9 | 9 | 120 | 150 | 57 |
| 2 | 3.5 | 9 | 8 | 134 | 134 | 46 |
| 3 | 7 | 8.9 | 8 | 120 | 121 | 44 |
| 4 | 10.5 | 8 | 8 | 140 | 143 | 51 |
| 5 | 17.5 | 7.7 | 8 | 150 | 130 | 55 |
| Starting skimmed milk | | 6.6 | 9 | 270 | 180 | 120 |

EXAMPLE 6

A skimmed milk is acidified by addition of a decationized sweet lactoserum. The acidified skimmed milk is passed over an anion exchanger in the OH⁻-form in a quantity of 10.5 l of acidified skimmed milk per exchanger equivalent.

A powdered milk adapted to the needs of infants is prepared by mixing the skimmed milk of reduced phosphate and calcium contents thus obtained with a demineralized lactoserum and fat in such proportions that the mixture contains, in percent based on the dry matter of the mixture, 21% of dry matter of this skimmed milk of reduced phosphate and calcium contents, 51.5% of dry matter of the demineralized lactoserum and 27.5% of fat. The mixture is concentrated by evaporation in vacuo to a dry matter content of 40% and then spray-dried. The powder obtained has a moisture content of approximately 5%.

The details concerning the characteristics and composition of the various products involved or obtained in this Example are shown in the following Table in which the percentages quoted are based on the total weight in the first four columns and on the weight of dry matter in the last three columns. To accommodate them on the page, the column headings have been abbreviated. The full headings are as follows:

1st column (sk. milk): starting skimmed milk
2nd column (dec.lact.): decationized lactoserum
3rd column (ac. sk. milk): acidified skimmed milk
4th column (red. sk. milk): skimmed milk of reduced phosphate and calcium contents
5th column (red. sk. milk): skimmed milk of reduced phosphate and calcium contents
6th column (dem. lact.): dimineralized lactoserum
7th column (adapt. milk): milk adapted to the needs of infants.

|  | Sk. milk | dec. lact. | ac. sk. milk | red. sk. milk | red. sk. milk | dem. lact. | adapt. milk |
|---|---|---|---|---|---|---|---|
| pH | 6.7 | 1.8 | 5.5 | 7.5 | 7.5 | 6.7 | 6.8 |
| Dry matter % | 9.0 | 5.5 | 8.0 | 8.0 | 8.0 | 20 | 95 |
| Casein % | 2.8 | 0 | 2.0 | 2.0 | 25 | 0 | 5.0 |
| Total serum proteins % | 0.6 | 0.6 | 0.6 | 0.6 | 7.5 | 12 | 7.4 |
| Fats % | 0.1 | 0.05 | 0.08 | 0.08 | 1.0 | 1.0 | 27.5 |
| Lactose % | 5.5 | 4.9 | 5.3 | 5.3 | 61 | 86 | 58 |
| Ca % | 0.115 | 0.002 | 0.081 | 0.042 | 0.58 | 0.34 | 0.28 |
| Mg % | 0.011 | 0.001 | 0.008 | 0.006 | 0.06 | 0.02 | 0.02 |
| Na % | 0.048 | 0.06 | 0.036 | 0.038 | 0.40 | 0.10 | 0.15 |
| K % | 0.165 | 0.016 | 0.116 | 0.122 | 1.40 | 0.30 | 0.45 |
| Phosphate % | 0.270 | 0.150 | 0.235 | 0.130 | 1.70 | 0.35 | 0.51 |
| Citrate % | 0.180 | 0.160 | 0.174 | 0.106 | 1.25 | 0.50 | 0.50 |
| Cl % | 0.120 | 0.100 | 0.112 | 0.093 | 0.90 | 0.08 | 0.22 |

The Cl content of the adapted milk is standardized during mixing to a value of from 0.3 to 0.45% by addition of KCl, $MgCl_2$ and/or $CaCl_2$.

I claim:

1. A process for the production of a milk product having reduced phosphate and calcium contents comprising acidifying skimmed milk to a pH of from 5.2 to 6.0 and passing the acidified skimmed milk over an anion exchanger.

2. A process as claimed in claim 1, wherein the skimmed milk is acidified to a pH of from 5.4 to 5.6.

3. A process as claimed in claim 1, wherein the skimmed milk is acidified with an acid selected from the group consisting of citric acid and hydrochloric acid.

4. A process as claimed in claim 1, wherein the skimmed milk is acidified with a decationized lactoserum.

5. A process as claimed in claim 1, wherein the anion exchanger is selected from the group consisting of a quaternary ammonium type, a secondary amine type and a tertiary amine type.

6. A process as claimed in claim 1, wherein the anion exchanger is in the $OH^-$-form.

7. A process as claimed in claim 1, wherein from 3.5 to 18 liters of skimmed milk per equivalent of exchanger capacity are passed over the anion exchanger.

8. A process as claimed in claim 6, further comprising neutralizing the milk product after passage over the anion exchanger.

9. A process as claimed in claim 1, further comprising mixing, in percent by weight based on the dry matter of the mixture, from 15 to 25% of dry matter of the milk product with from 45 to 55% of dry matter of a demineralized lactoserum and from 25 to 30% of fats.

10. A process as claimed in claim 4, wherein the decationized lactoserum has a pH of from 1.2 to 3.0.

11. A process as claimed in claim 1, wherein the anion exchanger is in the form selected from the group consisting of citrate and $Cl^-$/anions.

12. A milk product comprising in percent by weight of dry matter,
from 4.5 to 5.5% of casein,
from 7.0 to 8.0% of total serum proteins,
from 25 to 30% of fats,
from 54 to 62% of lactose,
from 0.2 to 0.4% of calcium,
from 0.015 to 0.05% of magnesium,
from 0.10 to 0.17% of sodium,
from 0.4 to 0.6% of potassium,
from 0.4 to 0.6% of phosphate,
from 0.3 to 3% of citrate, and
from 0.3 to 0.45% of chlorine.

* * * * *

UNITED STATES PATENT AND TRADEMARK OFFICE
CERTIFICATE OF CORRECTION

PATENT NO. : 4,663,172
DATED : May 5, 1987
INVENTOR(S) : Valentin Wenner

It is certified that error appears in the above—identified patent and that said Letters Patent is hereby corrected as shown below:

Column 2, line 55, "OH-form" should read --$OH^-$-form--.

Column 3, line 45, "oyer" should read --over--.

Column 5, line 7, "(dec.lact.)" should read --(dec. lact.)--.

Claim 11, column 6, line 30, "$Cl^-$/anions" should read --$Cl^-$ anions--.

Signed and Sealed this

Eighth Day of September, 1987

*Attest:*

DONALD J. QUIGG

*Attesting Officer*  *Commissioner of Patents and Trademarks*